United States Patent [19]

Sidler

[11] Patent Number: 5,692,594
[45] Date of Patent: Dec. 2, 1997

[54] TRANSPORT APPARATUS

[75] Inventor: Werner Sidler, Esslingen, Switzerland

[73] Assignee: Inmara AG, Pfaffikon, Switzerland

[21] Appl. No.: 543,703

[22] Filed: Oct. 16, 1995

[30] Foreign Application Priority Data

Oct. 21, 1994 [CH] Switzerland .......................... 03166/94
Feb. 16, 1995 [CH] Switzerland .......................... 00447/95

[51] Int. Cl.⁶ .......................................... B65G 47/26
[52] U.S. Cl. ...................... 198/459.8; 198/457; 198/792; 198/732
[58] Field of Search .......................... 198/457, 732, 198/733, 792, 459.8

[56] References Cited

U.S. PATENT DOCUMENTS

| | | | |
|---|---|---|---|
| 3,294,215 | 12/1966 | Walter | 198/459.8 |
| 3,701,407 | 10/1972 | Kulig | 198/457 |
| 4,227,606 | 10/1980 | Bogatzki | 198/459.8 |
| 4,776,448 | 10/1988 | Kulig | 198/457 |
| 5,277,296 | 1/1994 | Roberts et al. | 198/457 |

FOREIGN PATENT DOCUMENTS 56-11575  6/1979  Switzerland .

*Primary Examiner*—Joseph E. Valenza
*Attorney, Agent, or Firm*—Edwin D. Schindler

[57] ABSTRACT

A transport apparatus for use in a mass production is provided, which includes a first transport belt for transporting objects at either regular or irregular intervals and for discharging such objects at a zone of transfer. A second transport belt is included for receiving the objects at the zone of transfer from the first transport belt and for discharging the objects with equal spacings between such objects. An endlessly revolving articulated link chain, having chain links connected to one another by articulated links, has drivers mounted on every second articulated link. A first guide rail has a guide edge for displaceably guiding the articulated links upon which said drivers are mounted, while a second guide rail extends in a line deviating from the course of the first guide rail so that a spacing between the first guide rail and the second guide rail increases within the zone of transfer for temporarily reducing the spacing between the drivers. Arms arranged on the articulated links of the link chain, with the articulated links supporting the arms being disposed between the articulated links upon which the drivers are mounted. A guide body is mounted on each of the arms, with each of the guide bodies being guided by the second guide rail. The arms permit a substantially torsion-free deflection of the chain links within the zone of transfer.

19 Claims, 7 Drawing Sheets

FIG. 7
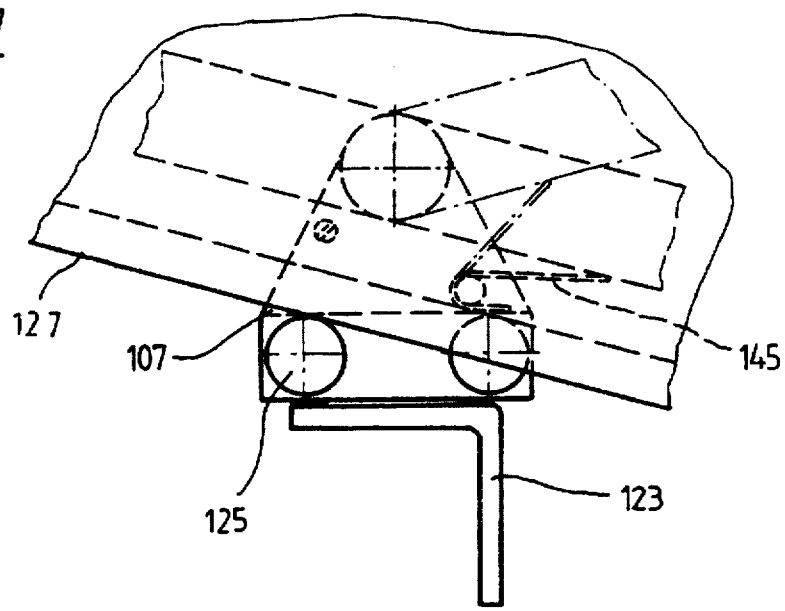
FIG. 8
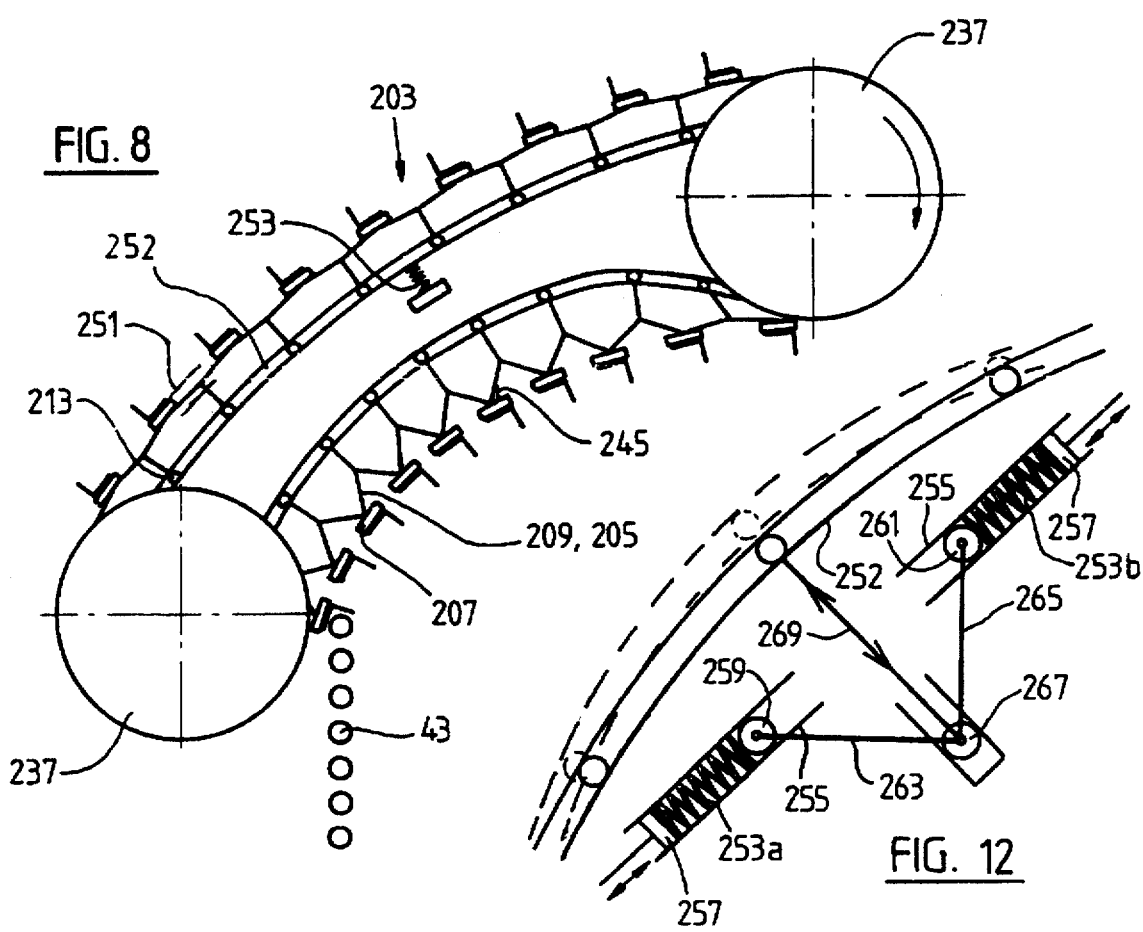
FIG. 12

TRANSPORT APPARATUS

BACKGROUND OF INVENTION

1. Technical Field of the Invention

The present invention relates, generally, to a transport apparatus for articles, e.g., containers, in a mass production process.

More particularly, the present invention relates to a transport apparatus for mass produced articles having first transport means for such articles placed at either regular or irregular intervals, which articles are to be discharged from a second transport means with regularized, equal spacing, and having an endlessly revolving articulated link chain with drivers mounted on the articulated links of said chain.

In many areas of mass production, machines used for processing the articles to be manufactured have to be linked with one another. Both the processing speed and the spacing between the successively advancing products may vary as such products are fed at regular intervals, which may be either shorter or longer than the spacings between the workpieces so received. The transport apparatus of the present invention is intended in such areas of endeavor, but should not be seen as necessarily being limited to such technical uses.

2. Description of the Prior Art

An arrangement for setting equal spacings between piece goods in a mass production process, such piece goods being transported on a conveyor belt, to at least one station for further treatment, is disclosed in Swiss Patent No. 5-611, 875. The arrangement of the prior art permits feeding piece goods to a next machine downstream with exactly the same spacing between the piece goods. This prior art apparatus has an endlessly rotating articulated link chain, on which each second link of the chain supports a driver, which engages the piece goods supplied to the arrangement by a first conveyvor belt and transfers such goods to a second conveyvor belt. With the zone of transition from the first conveyor belt to the second belt, the articulated link chain is guided in a guide rail. This guide rail is engaged by guide bodies, each of which are connected with each second link of the articulated link chain. The guide rail and the guide bodies are disposed above the articulated link chain.

The guide bodies of the prior art apparatus are also arranged on the underside of the articulated links between the articulated links supporting the drivers; said guide bodies being guided in a second guide rail within the zone of transition between the first transport belt and the second transport belt, wherein said second guide rail extends in a line deviating from the course of the first guide rail. On the inlet side of the transition zone, the second guide rail extends successively away from the first guide rail and then over a larger zone with a spacing from the first guide rail. In this manner, the links of the chain extend zig-zag-like in the zone of transition, because the chain links are alternately guided by the first and second guide rails. This means that the chain links supporting the drivers come closer to each other in the zone of transition and, consequently, also push together the piece goods carried along by them. If two guide rails have a zone or segment where the rails extend parallel with each other, the drivers are spaced equally apart in said zone; such spacings being shorter than those in the zones where the two guide rails are disposed directly one atop of the other and where the chain is consequently stretched. In the stretched condition of the chain, guidance of the lower chain links, or their guide bodies, of course, can be omitted.

The transport apparatus disclosed by the prior art satisfies production requirements with respect to bringing the piece goods together with equal spacings between the goods. When the link chain is pulled apart to assume the zig-zag shape, however, the chain is torsionally stressed perpendicular to the direction of the transport by the lateral displacement of the articulated links. At high transport speeds, and resistance by the piece goods guided by the drivers, the link chain is subjected to high wear.

SUMMARY OF THE INVENTION

It is, therefore, an object of the present invention to provide a transport apparatus for use in the mass production of articles, which includes a link chain which avoids the drawbacks of known link chains and relieves the chain of torsional forces within the zone where the drivers are brought together.

The foregoing and related objects are achieved by the transport device of the present invention, which includes an endlessly revolving articulated link chain having drivers mounted on the articulated links of the chain with a driver being mounted on each second articulated link. The articulated links on which the drivers are mounted are displaceably guided in a first guide rail. Within the range of the articulated links which are disposed between the articulated links with the drivers, are arms arranged on the chain links, with a deflecting roller being arranged on the arms; the deflecting roller being guided in a second guide rail. The spacing of the second guide rail from the first guide rail increases within the zone of transfer between the first transport means and the second transport means in order to temporarily reduce the spacing between the drivers.

More particularly, the second guide rail extends in a line deviating from the course of the first guide rail for deflecting the second articulated links disposed between the first articulated links supporting the drivers, between a discharge zone of the first transport means and a receiving zone of a second transport means. The arms each have a guide body mounted thereon, the guide body being intended for engaging the second guide rail, which is mounted on each second articulated link. Each of the arms is actively connected with one of the chain links and mounted thereon with an angle relative to said chain link.

By arranging the guide bodies of the articulated links, the guide bodies being arranged between the articulated links supporting the drivers, on an arm that is mounted on the articulated link and projects away from the latter sideways, it is possible, on the one hand, to guide the articulated links supporting the drivers at both the top and the bottom, and to deflect the articulated links disposed in between by the arm, on the other hand, such arm serving as a lever.

Two guide bodies can be mounted on the arm, as well, so that said guide bodies, too, will not cause any torsional effect acting on the link chain. The guide rails, which are disposed with an exact lateral spacing from the rollers guiding the chain and deflecting rollers, permit the latter to smoothly run into the deflecting guide rail at the inlet of the zone of deflection. Within the zone of transition from the feeding to the discharging transport belt, the drivers can be guided along a curve with lateral support by rollers arranged on said drivers. By adjusting the spacing between two guide rails, it is possible to adapt the spacings of the drivers following each other exactly meeting the requirements at any point.

The first guide rail can be adapted to the requirements in that it can extend in a straight or curved line. A curved guide rail permits the transfer of piece goods to conveyor belts arranged at an angle relative to each other. By bringing the drivers following one another closer together, or by bringing the articles guided between such drivers temporarily closer together, such articles can be transferred, without difficulty, from the first to the second transport belt via the stationary connecting surface. This arrangement eliminates the latent risk of tall objects with a small supporting base from toppling over. An elastic connection of the drivers with the articulated links effects vibration-free guidance and, additionally, reduces the noise level.

Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the invention.

BRIEF DESCRIPTION OF THE DRAWING FIGURES

In the drawing, wherein similar reference numerals denote similar features throughout the several views:

FIG. 7 shows an enlarged view of the drivers of the present invention during transfer of the workpiece;

FIG. 8 is a top view of an alternative embodiment of the transport apparatus of the present invention having two reversing wheels;

DETAILED DESCRIPTION OF THE DRAWING FIGURES AND PREFERRED EMBODIMENTS

Figure 1:
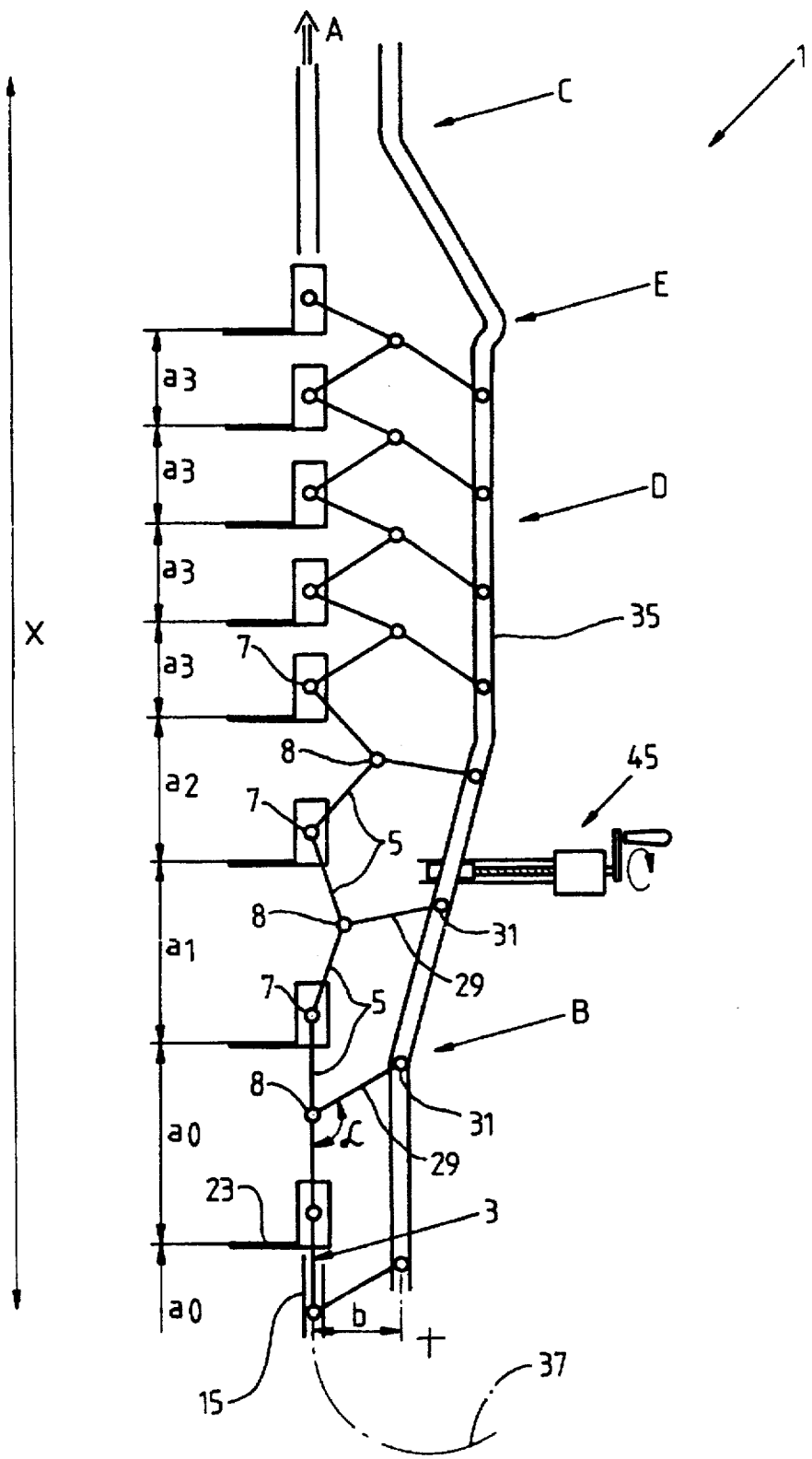
FIG. 1 shows an enlarged top view of two drivers and an arm supporting a guide body of the transport apparatus of the present invention.

Turning now, in detail, to an analysis of the drawing figures, in FIG. 1, the mode of operation of the transport apparatus 1 is shown on a stretched, straight-line segment of a transport line X. On the inlet side, a link chain 3, the latter comprising the many articulated links 7, 8, which are endlessly joined with each other, is received in the transport line X. The chain links 5 include flat sheet metal strips 9, with their ends each being provided with a bore for receiving an articulated pin 11. The articulated pins 11 project beyond the sheet metal strips 9 and support chain-guiding rollers 13, which are designed for being guided on both sides in a first guide rail 15. When the chain-guiding rollers 13 are used and arranged on the link chain 3, both at the top and bottom, two first guide rails 15 are, of course, used as well; such guide rails being mounted on the bottom 17 and on the ceiling 19 of a chain guide housing 21, and extending parallel one atop of the other.

A driver 23 is arranged on each second articulated link 7; such driver supporting at least one support roller 25 having a vertically extending rotary axle. The support roller 25 laterally rests against the chain guide housing 21 on a guide edge 27 and guides the driver 23 along the guide edge 27.

Figure 3:
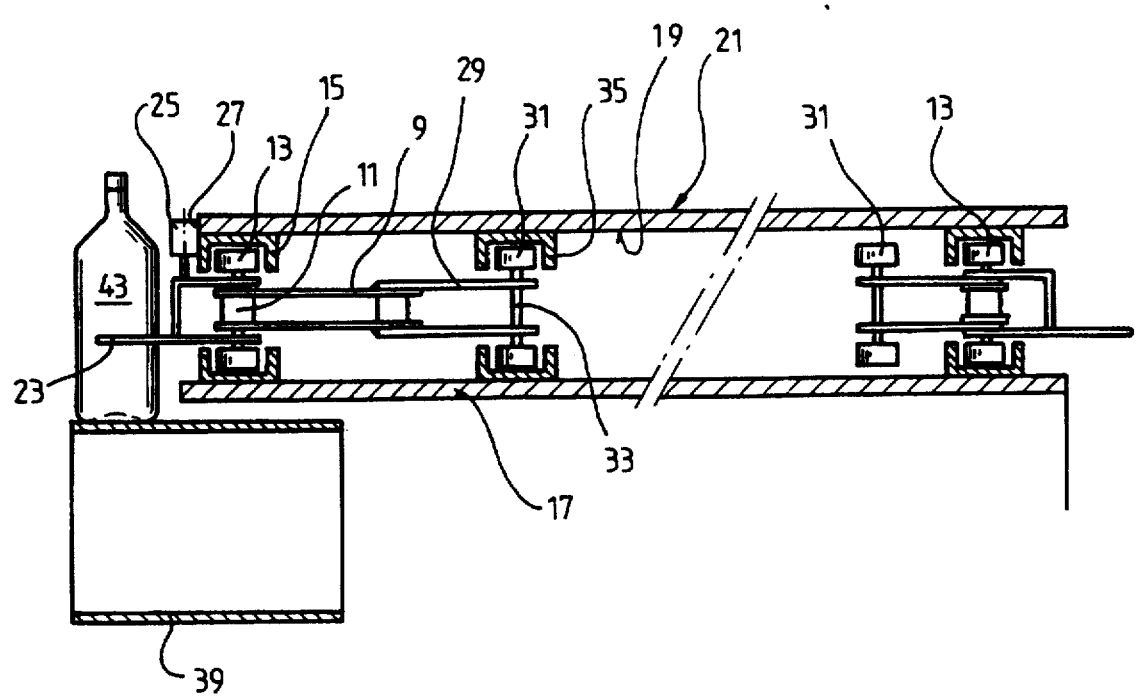
FIG. 3 shows a cross-sectional view through the transport apparatus taken along the II—II line in FIG. 2.

An arm 29 is arranged on each second chain link 5 within the range of the free articulated link 8, said arm projecting from the longitudinal direction of the chain link 5 at an angle alpha amounting to 90°±30° and being rigidly joined with said chain link 5. Analogous to the structure of the link chain 3, a strip-like arm 29 can be mounted on both the top and bottom sheet metal strip 9, as well (see, FIG. 3.)

Guide bodies, for example, in the form of slides or deflecting rollers 31, which are rotatably mounted on a vertically installed shaft 33, are arranged on the free end(s) of the arm(s) 29. In the segment X, the deflecting rollers 31 engage the second guide rails 35, which are mounted on the ceiling 19 and/or the bottom 17 of the chain guide housing 21. The second guide rails 35 always extend next to the first guide rail 15. On the inlet side, their minimum spacing b corresponds with the lateral spacing of the chain guide rollers 13 from the deflecting rollers 31, when the link chain 3 is in the stretched condition.

In a particularly advantageous embodiment of the present invention, the articulated link 107, the latter supporting the driver 123, has a substantially triangular shape; and the two guide rollers 125, of which at least one roller is intended to rest against the guide edge 27 when the articulated links 107 are guided along said edge 27. The chain guide roller 113 is mounted on the third corner of the triangularly-shaped articulated link 107 and rotatably supported on the articulated pin 111. A stop spike 141, which projects downwardly from the articulated link 107, serves the purpose of limiting the swivel of the articulated link 107 with respect to the sheet metal strip 109 of the link chain 105. The one end of a spring 145 is fastened on the articulated link 107 with a bolt 143. The second end of the spring 145 rests against the adjacent sheet metal strip 109, which is fastened with its end on the articulated pin 111, as well. The driver 123 is fastened on the front edge of the articulated link 107.

Figure 4:
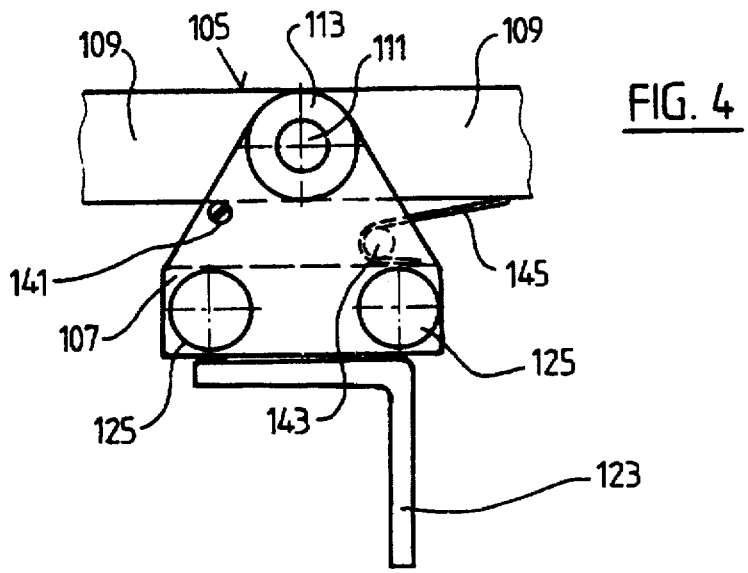
FIG. 4 is an enlarged view of a driver in a straight segment of the line of transport.

The position of the articulated link 107, shown in FIG. 4, is assumed at point A (FIG. 2), when one of the two support rollers 125 rests against the guide edge 127. In said section, the spring 145 causes the articulated link 107 to be pressed against the guide edge 127 via one of the rollers 125. This permits moving the driver 123 in a uniform manner and prevents vibration from being introduced into the transported workpiece 43.

Figure 5:
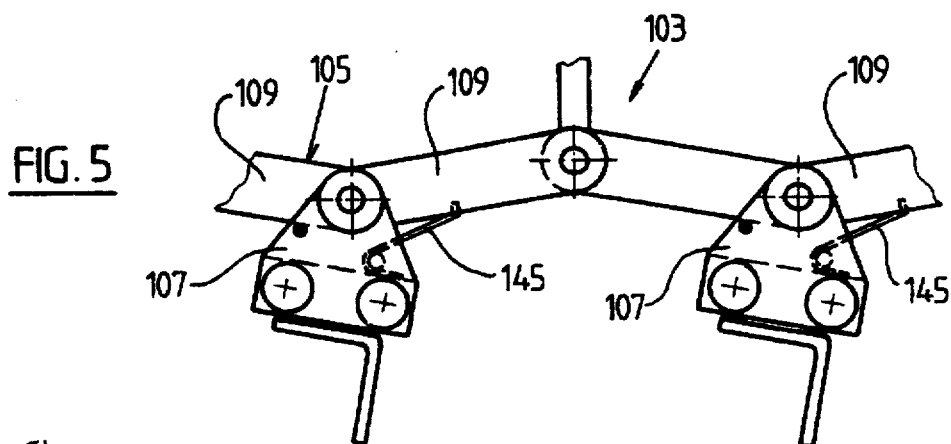
FIG. 5 shows an enlarged view of the drivers of the transport apparatus of the present invention with a reduced spacing between each other.

The position of two articulated links 107—which are disposed next to each other—as shown in FIG. 5, is assumed when the link chain 103 is not required to guide any work-pieces 43 and is guided from the workpiece discharge point back to the workpiece receiving point (point B.) In said zone, the link chain 103 is not guided by guide rails 15, but the strings of the chain extend directly from the reversing roller 37 to the reversing roller 37. In said free, unguided segments, the sheet metal strips 109, forming the chain links 105, are brought into a zig-zag line by the force of the spring 145, which significantly shortens the total length of the link chain 103. Furthermore, the link chain 103 is guided in said segments with low vibration. The springs 145 can also replace the chain-tensioning spring 38.

Figure 6:
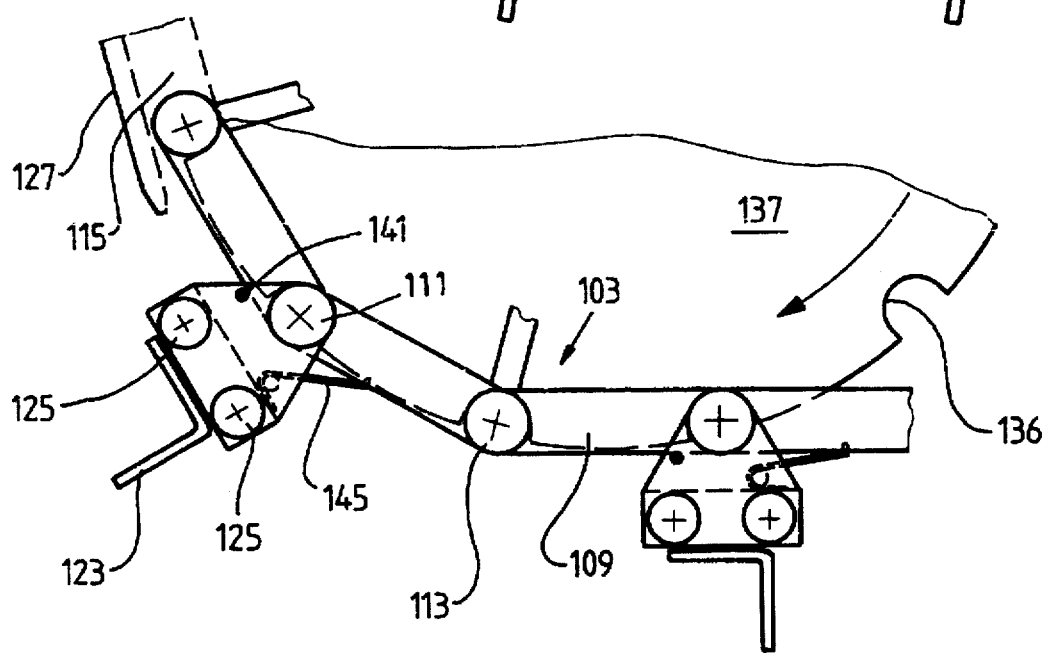
FIG. 6 shows an enlarged view of the drivers of the present invention in a convex segment of the line of transport.

In the representation according to FIG. 6, the link chain 103 is in the inlet zone C where the articulated links 107 run into the guide 115. In the curved line of guidance, the spring 145 causes the stop spikes 141 to always rest against the leading sheet metal strip 109 (viewed in the direction of transport), with the consequences that the articulated links 107 can run into the guide rail 115 smoothly and substantially free of shocks. As soon as the articulated link 107 rest against one of the two support rollers 125 on the guide edge 127, guidance of the articulated link 107 and the driver 123 mounted thereon is taken over by the guide edge 127. Before the chain guide rollers 113 are guided into the guide rails 115, the articulated pins 111 are guided by the recesses 136 on the reversing wheel 137.

The position of the articulated link 107, shown in FIG. 7, is obtained in the outlet zone D when the workpieces 43 are released again by the driver 123. The guide edge 27 effects a successive swiveling of the articulated link 107 counter-clockwise and, thus, a swiveling of the driver 123 and its release from the workpiece 43 which, at such point, has been taken over by the second transport means 41 (see, FIG. 2.) If provision is made that the second roller 125 is mounted axially displaced downwardly relative to the first roller, and that a second guide edge is present, the latter being recessed, such guide edge limits the range of swivel of the articulated link 107.

In the embodiment of the present invention according to FIG. 6, the link chain 203 is guided only around two reversing wheels 237. The third reversing wheel which, in the first embodiment described, also serves as the tensioning roller, is omitted in the embodiment of FIG. 8. The link chain 203 is tensioned by a rear guide 251, 252 which, analogous to the guide 35 in FIG. 1, is capable of guiding the links of the link chain 203 in a zig-zag line in order to shorten, or extend, in this way, the returning string of the chain depending on whether the articulated links 207 are guided on the advancing string of the chain with small or larger spacings between each other.

For adjusting a pretension on the returning string of the link chain 207, the rear guide 251 can be parallel displaceable with a spindle, as shown in the embodiment of FIG. 1, or swivel-mounted, rotating around a point of rotation, or it can be forced outwardly by a spring 253.

In a particularly advantageous embodiment of the invention according to FIG. 12, the spring 253 of FIG. 8, can be replaced by a spring pair 253a, 253b, which are placed in the two guides 255, and which are supported on the adjustable retaining means 257 and adjustable by said means. The front ends of the two springs 253a, 263b, each pressed on a roller 259, 261, respectively, the latter being connected with a third roller 267 via a push rod 263, 265. The third roller 267 is connected with the rear guide rail 252 via an adjusting rod 269; the chain guide rollers 213 are guided in said rear guide rail. The angular position of the two push rods 263, 265, with respect to the guide 255, geometrically substantially correspond with the angular position between the chain links 205 within the range of the rear guides 251, 252. In this manner, it is possible to precisely determine and adjust the tension of the returning string of the chain 203.

Figure 9:
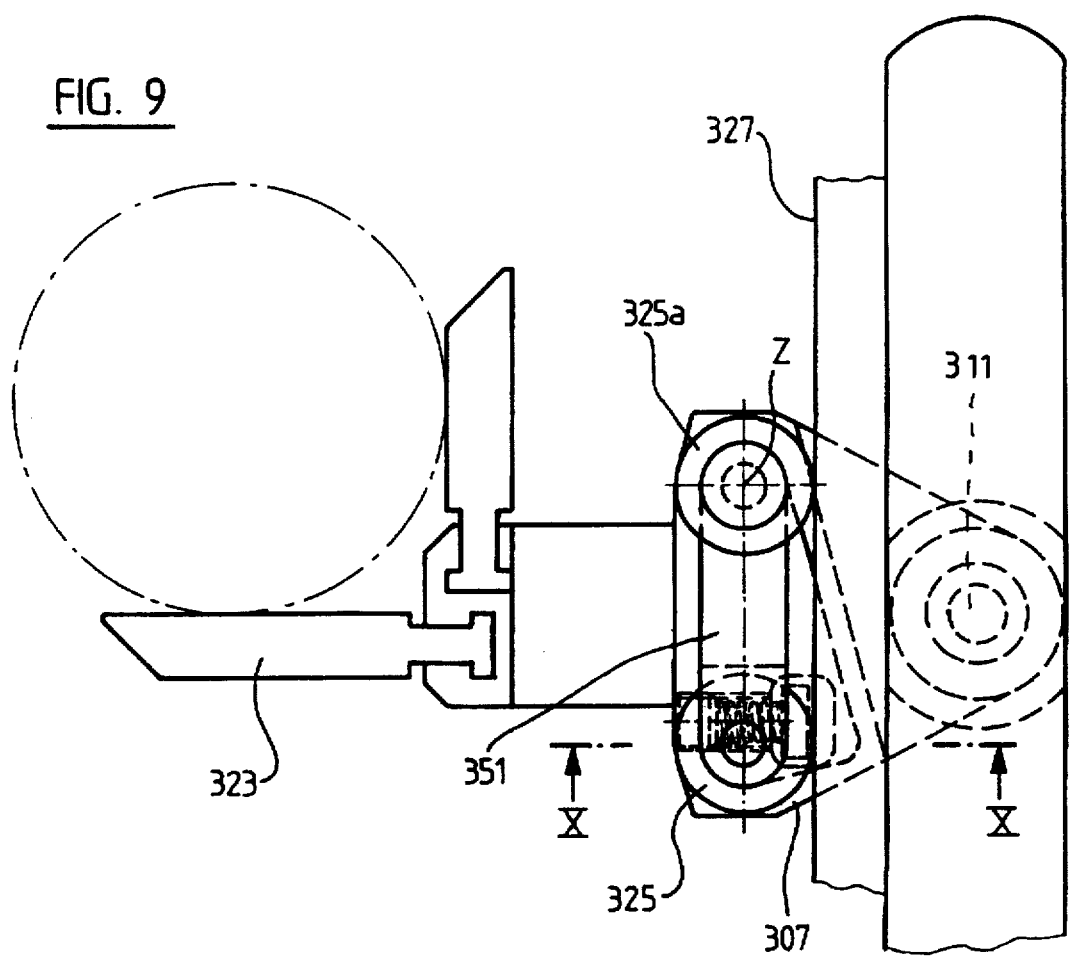
FIG. 9 shows an outline for an alternative construction of the driver for use in the transport apparatus of the present invention.
Figure 10:
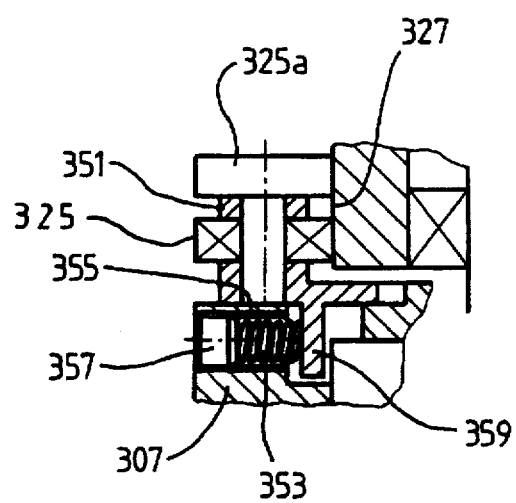
FIG. 10 shows a sectional view taken along the X—X line of FIG. 9.

FIGS. 9 and 10 show a further construction of the articulated link 307 with the driver 323. The latter is mounted on a swivel arm 351 and is capable of swiveling around a vertical axis Z against the force of a spring 353.

The articulated link 307 is connected with a pivot pin 311. The spring 353 serves the purpose of pressing the swivel arm 351—of the two retaining rollers 325, 325a mounted thereon—against guide edge 327. For such purpose, a threaded bore 355 is provided on the articulated link 307. A screw bolt 357 is screwed into said bore; the latter supporting the spring 353, which is designed in the form of a screw. The spring forces the swivel arm 351 against the guide edge 327 via a spike 359 and prevents the retaining rollers 325 from being lifted off during operation.

Figure 2:
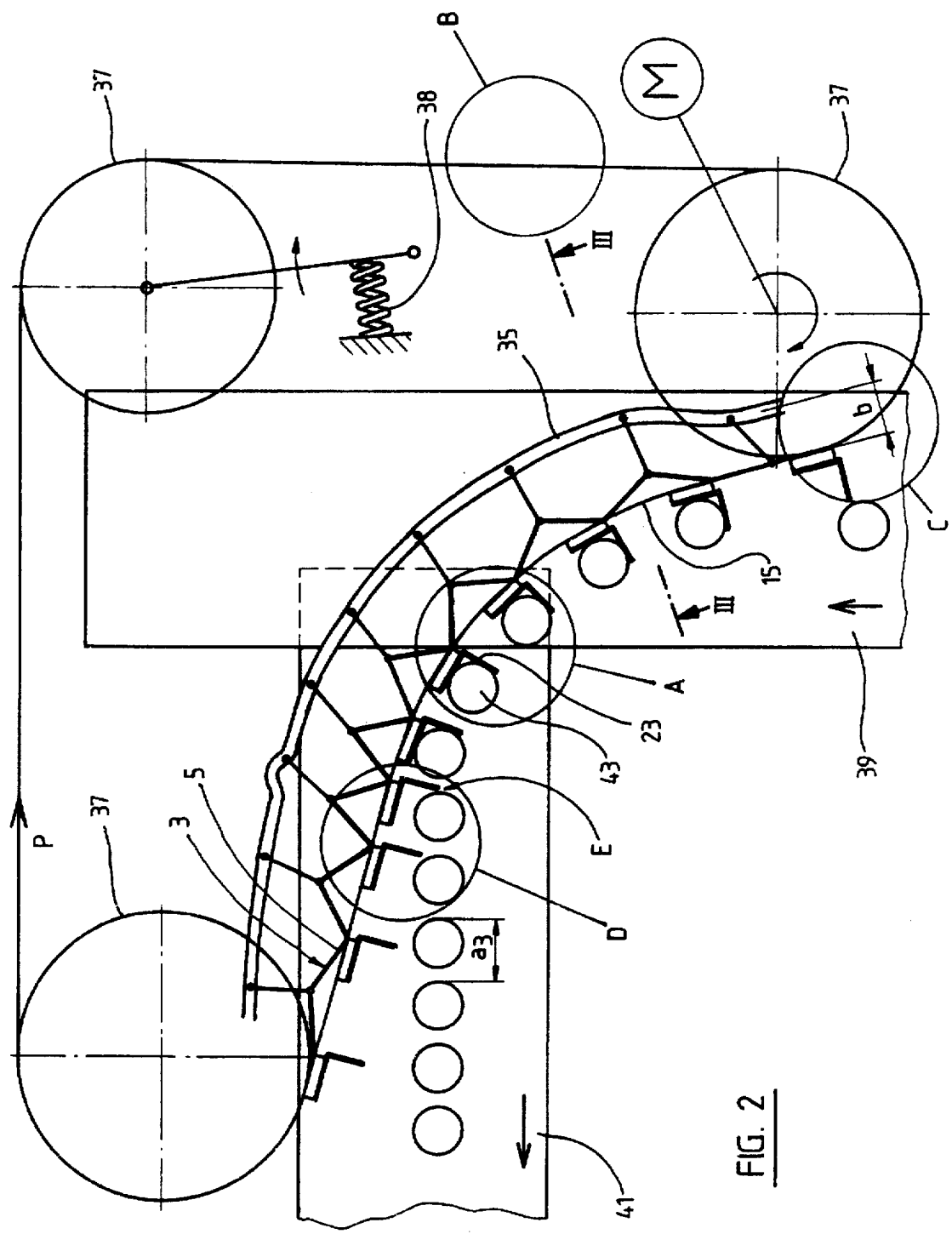
FIG. 2 shows a top view of the transport apparatus of the present invention.
Figure 11:
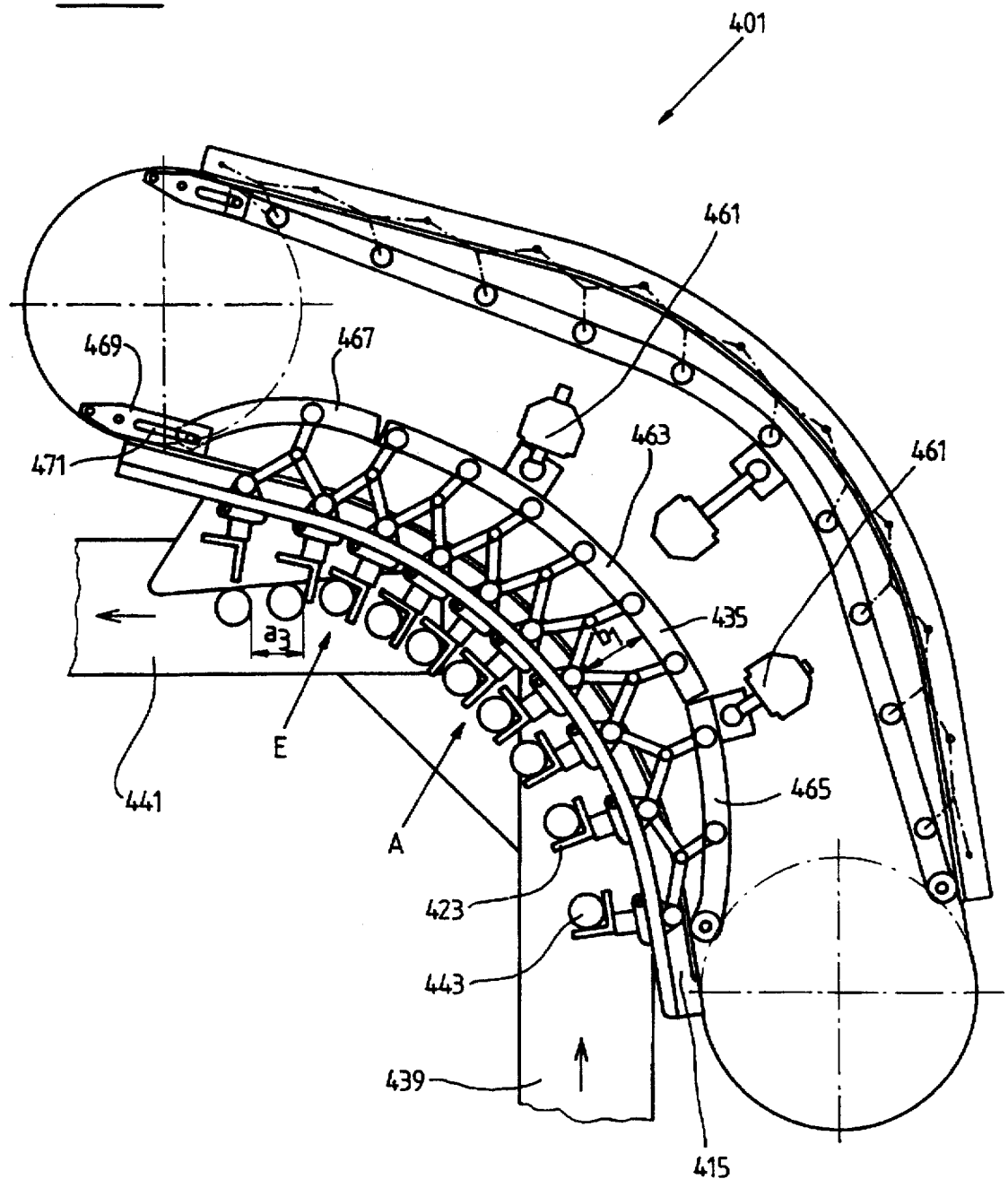
FIG. 11 is a top view of an alternative, preferred embodiment of the transport apparatus of the present invention; and, FIG. 12 shows a detail of a tension spring in the returning string of a further, preferred embodiment of the present invention.

In the representation of the invention according to FIG. 11, the drivers 423 have already been brought together in the inlet zone A of the curve to such an extent that the transported objects 443 are enclosed with little clearance from the leading driver 423. In order to accomplish this, the second guide rail 435 already extends into the inlet zone with an increasing spacing $b_1$ from the first guide rail 415. The spacing $b_1$ is maintained until the drivers 423 have guided the objects 443 onto the second transport belt 441 within zone E. Then follows, as shown in FIG. 2, the formation of the desired spacing as between objects 443, which are set by adjusting the spacing between the two guide rails 415, 435, accordingly.

Within the zone of transfer of the transport belts 439, 441, the second transport rail 435 has a curved shape, which allows it to be adjusted inwardly and outwardly radially relative to the first guide rail 415 by means of the adjusting means 461. The inlet and outlet rails 465, 467 are mounted on the inlet and outlet sides of the curved rail segment 463. A length compensation part 469, with a compensation slot 471, is additionally installed on the outlet side.

The foregoing embodiment of the present invention permits constructing the transport device 401 in a more compact way. No further rotating element is required.

Mode of Operation

The mode of operation of the transport apparatus 1 is explained in greater detail by further reference to the drawing figures:

Driven by the driving motor M on one of the reversing and driving wheels 37, which are fitted with a tensioning device 38, the link chain 3 is moved in the direction of arrow P. It is first received in a completely stretched condition in the section X of transport apparatus 1; said section being shown at the bottom of FIG. 1. The chain links 5 are, consequently, disposed in a straight line and the articulated links 7 have the spacing $a_0$ between each other. The deflecting rollers 31, supported by the arms 29, are disposed in a straight line as well as arranged with a lateral spring b from the chain guide rollers 13, and with uniform spacing $a_0$ one after the other. In the zone shown, the first guide rail 15 extends in a straight line. Starting at point B, the second guide rail 35 begins to move away from the parallel position relative to the first guide rail 15 in a curved path. The deflecting rollers 31 guided in the second guide rail 35 laterally pull the articulated links 8 from the range of the first guide rail 15 via the arms 29. This reduces the spacing between the drivers 23 successively ($a_1, a_2, a_3 \ldots$) until the second guide rail 35 is united again with the first guide rail 15 in zone C. If provision is made for a parallel extending zone D for the two guide rails 15, 35, the spacings a3 between the drivers 23 remain unchanged in this zone.

The piece goods or workpieces 43, e.g., containers, transported by a first transport means 39 against the drivers 23 are consequently successively pushed together in zone X of the transport apparatus 1, shown in FIG. 1, and transferred at the end to a second transport means 41 with a constant spacing $a_2$ (see, also, FIG. 2.)

Of course, the direction of transport of the link chain 3 could also be reversed and the spacing between the piece goods 43 could be increased in this way to the spacing $a_0$.

In the schematic representation according to FIG. 1, the string of the chain between the reversing rollers 37 is shown extending in a straight line for explaining the invention, i.e., the guide rail 15 extends in a straight line, as well, as does the guide edge 27 on the chain guide housing 21.

Alternatively, the transport apparatus 1 can also be arranged at the point of intersection of the two transport means 39, 41; the latter extending, for example, at a right angle relative to each other (FIG. 2.) In such an embodiment of the invention, both the guide edge 27 and the first guide rail 15 extend in a curved line; the path of the link chain 3 between the end of the curved segment and the inlet into said zone may be designed in any desired manner in accordance with production requirements.

In the example shown according to FIG. 2, the containers 43, which are supplied by the first transport means 39, are received in the range of the drivers 23 and are guided by the latter first with, either, a large even or uneven spacing $a_0$ on the first transport means 39 to the second transport means 41; the drivers 23 are successively brought together to the desired discharge spacing $a_3$. At the moment the containers 43 are released by drivers 23, said containers consequently have the predetermined spacing $a_3$.

As the drivers 23 have to be moved out of the range of the containers 43, the spacing between the drivers 23 is, preferably, reduced further so that the conveyed container 43, now transported by the second transport means 41 at the specified rate of transport, can remove itself from the driver (of situation E.) In order to obtain the reduction of the spacing $a_4$, the second guide rail 35 moves away from the first guide rail 15, even further before it subsequently comes closer, again, at the outlet of segment X; until the link chain 3 is stretched and capable of returning to the inlet point without further guidance.

Furthermore, the second guide rail 35 can be mounted on the chain guide housing 21 in such a way that it is displaceable against the first guide rail 15. In this way, the spacing between the drivers 23 can be reduced by reducing the spacing between the two guide rails 15, 35, or the spacings between the drivers 23 can be increased by increasing the spacing between the two guide rails 15, 35. Provision for adjustability of the spacing between the two guide rails 15, 35 can be made only for individual segments, i.e., by changing the spacing in certain transport segments, it is possible to cause the drivers to come closer, or move further away, either earlier or later, in order to be able to adapt the transport apparatus 1 to the given production conditions. A displacement device 45 is shown schematically in FIG. 1.

While only several embodiments of the present invention have been shown and described, it will be obvious to those skilled in the art that many modifications may be made to the present invention without departing from the spirit and scope thereof.

What is claimed is:

1. Transport apparatus for use in a mass production procedure, comprising:

first transport means for transporting objects at either regular or irregular intervals and for discharging said objects at a zone of transfer;

second transport means for receiving objects at said zone of transfer from said first transport means and for discharging said objects with equal spacings between said objects;

an endlessly revolving articulated link chain having chain links connected to one another by articulated links;

drivers mounted on every second articulated link of said articulated link chain;

a first guide rail having a guide edge for displaceably guiding said articulated links upon which said drivers are mounted;

a second guide rail extending in a line deviating from the course of said first guide rail so that a spacing between said first guide rail and said second guide rail increases within said zone of transfer for temporarily reducing the spacing between said drivers;

arms arranged on the articulated links of said link chain, the articulated links supporting said arms being disposed between said articulated links upon which said drivers are mounted; and, a guide body being mounted on each of said arms, each of said guide bodies being guided by said second guide rail, said arms permitting a substantially torsion-free deflection of the chain links in said zone of transfer.

2. The transport apparatus according to claim 1, wherein each of said arms is mounted on one of said chain links supporting said arm at an angle of 90°±30°.

3. The transport apparatus according to claim 1, wherein said articulated links supporting said drivers are guided at the top and bottom in said first guide rail.

4. The transport apparatus according to claim 1, wherein each of said guide bodies is a slide.

5. The transport apparatus according to claim 1, wherein each of said guide bodies is a deflecting roller.

6. The transport apparatus according to claim 1, further comprising chain guide rollers laterally spaced from said guide bodies, wherein on an inlet side, said second guide rail extends with a spacing b from said first guide rail, said spacing b conforming to said spacing between said chain guide rollers and said guide bodies.

7. The transport apparatus according to claim 1, further comprising support rollers mounted on said drivers, said support rollers being capable of laterally rolling along said guide edge.

8. The transport apparatus according to claim 1, wherein said first guide rail extends in a straight line, while said second guide rail extends within an inlet zone with an increasing spacing from said first guide rail after said drivers are brought closer together when transferring said objects to said second transport means and for detaching said drivers from said objects.

9. The transport apparatus according to claim 1, wherein said first guide rail extends in a curved line, while said second guide rail extends within an inlet zone with an increasing spacing from said first guide rail after said drivers are brought closer together when transferring said objects to said second transport means and for detaching said drivers from said objects.

10. The transport apparatus according to claim 1, further comprising a spring, wherein the articulated links and at least one adjoining chain link are connected with each other by said spring.

11. The transport apparatus according to claim 10, wherein said spring is mounted on one of said articulated links or said adjoining chain link, with said spring connecting said articulated link and said adjoining chain link, the latter being flexibly connected to one another by a pivot pin.

12. The transport apparatus according to claim 1, further comprising two reversing wheels and wherein said link chain is provided with two strings, with said link chain being guided around said two reversing wheels and said two strings of said link chain being guided between said reversing wheels in a straight path extending from said first guide rail and said second guide rail, said second guide rail being displaceable against said first guide rail and being adjustable for tensioning the strings of said chain link running in said second guide rail.

13. The transport apparatus according to claim 12, wherein said second guide rail is displaceable against said first guide rail and is adjustable for tensioning the strings of said chain link via a spring.

14. The transport apparatus according to claim 12, wherein said second guide rail is displaceable against said first guide rail and is adjustable for tensioning the strings of said chain link via an elbow lever arrangement.

15. The transport apparatus according to claim 1, further comprising two reversing wheels and wherein said link chain is provided with two strings, with said link chain being guided around said two reversing wheels and said two strings of said link chain being guided between said reversing wheels in a curved path extending from said first guide rail and said second guide rail, said second guide rail being displaceable against said first guide rail and being adjustable for tensioning the strings of said chain link running in said second guide rail.

16. The transport apparatus according to claim 15, wherein said second guide rail is displaceable against said first guide rail and is adjustable for tensioning the strings of said chain link via a spring.

17. The transport apparatus according to claim 15, wherein said second guide rail is displaceable against said first guide rail and is adjustable for tensioning the strings of said chain link via an elbow lever arrangement.

18. The transport apparatus according to claim 1, further comprising a swivel arm upon which said drivers are arranged, and two support rollers being rotatably supported on said swivel arm, said two support rollers being biassed against said guide edge via a spring.

19. The transport apparatus according to claim 1, wherein within said zone of transfer from said first transport means to said second transport means, said second guide rail has its greatest spacing from said first guide rail.

* * * * *